US012682806B2

(12) United States Patent　　(10) Patent No.:　US 12,682,806 B2
　　Huang et al.　　　　　　　　　　(45) Date of Patent:　　Jul. 14, 2026

(54) IMAGE DISPLAY LUMINANCE COMPENSATION METHOD, COMPUTER DEVICE, AND STORAGE MEDIUM

(71) Applicant: Glenfly Tech Co., Ltd., Shanghai (CN)

(72) Inventors: Long Huang, Shanghai (CN); Jiajun Li, Shanghai (CN); Kun Yang, Shanghai (CN); Jianhong Pan, Shanghai (CN); Chaohai Chang, Shanghai (CN); Lei Huang, Shanghai (CN); Xiaoguang Wang, Shanghai (CN); Wei Zhang, Shanghai (CN)

(73) Assignee: Glenfly Tech Co. Ltd., Shanghai (CN)

( * ) Notice: Subject to any disclaimer, the term of this patent is extended or adjusted under 35 U.S.C. 154(b) by 0 days.

(21) Appl. No.: 19/029,180

(22) Filed: Jan. 17, 2025

(65) Prior Publication Data

US 2026/0073829 A1　　Mar. 12, 2026

(30) Foreign Application Priority Data

Sep. 10, 2024　(CN) ......................... 202411268804.X

(51) Int. Cl.
　　*G09G 3/20*　　　　(2006.01)
　　*G09G 3/36*　　　　(2006.01)
　　　　　　(Continued)

(52) U.S. Cl.
　　CPC ......... *G09G 3/2007* (2013.01); *G09G 3/2003* (2013.01); *G09G 3/2077* (2013.01); *G09G 3/3607* (2013.01); *H04N 23/71* (2023.01);

*H04N 23/73* (2023.01); *G09G 3/3208* (2013.01); *G09G 2320/0233* (2013.01); (Continued)

(58) Field of Classification Search
CPC ....... G09G 2320/0673; G09G 2360/16; G09G 3/3607; G09G 2320/0626; G09G 3/2003; G09G 3/3648; G09G 3/2007; G09G 3/2077; G09G 2320/0271; G09G 2320/0686; G09G 2320/0233; G09G 2320/0242; G09G 2320/0276
See application file for complete search history.

(56) References Cited

U.S. PATENT DOCUMENTS

2013/0120659 A1*　5/2013　Park .......................... G09G 5/02
　　　　　　　　　　　　　　　　　　　348/E5.074
2016/0267838 A1*　9/2016　Zhang .................. G09G 3/3225
　　　　　　　　(Continued)

*Primary Examiner* — Dismery Mercedes
(74) *Attorney, Agent, or Firm* — Nixon Peabody LLP

(57)　　　　　　ABSTRACT

The present disclosure relates to an image display luminance compensation method and apparatus, device, storage medium and program product. The method includes: obtaining camera exposure times of respective grayscale images to be captured under a maximum target luminance; controlling a photographing device to capture the grayscale images according to the camera exposure times, and obtaining luminance data of each of the grayscale images captured; determining a target region in each of the grayscale images according to the luminance data of each of the grayscale images; calculating grayscale compensation values of the target region according to the luminance data of each of the grayscale images; and performing luminance compensation on the target region according to the grayscale compensation values of the target region.

18 Claims, 11 Drawing Sheets

(51) Int. Cl.
　　H04N 23/71　　　　(2023.01)
　　H04N 23/73　　　　(2023.01)
　　*G09G 3/3208*　　　　(2016.01)

(52) U.S. Cl.
　　CPC ............... *G09G 2320/0242* (2013.01); *G09G 2320/0271* (2013.01); *G09G 2320/0276* (2013.01); *G09G 2320/0626* (2013.01); *G09G 2320/0673* (2013.01); *G09G 2320/0686* (2013.01); *G09G 2360/16* (2013.01)

(56)　　　　　　　　References Cited

U.S. PATENT DOCUMENTS

| | | | |
|---|---|---|---|
| 2017/0249890 A1* | 8/2017 | Yoo | G09G 3/2077 |
| 2019/0266968 A1* | 8/2019 | Wang | H04N 1/4015 |
| 2020/0126497 A1* | 4/2020 | Wang | G09G 5/10 |
| 2020/0193937 A1* | 6/2020 | Tsai | G09G 5/02 |
| 2021/0327370 A1* | 10/2021 | Lan | G09G 3/36 |
| 2022/0059037 A1* | 2/2022 | Bae | G09G 3/3233 |
| 2022/0198977 A1* | 6/2022 | Kim | G09G 3/006 |
| 2024/0257690 A1* | 8/2024 | Huang | G09G 3/2007 |
| 2025/0014327 A1* | 1/2025 | Kiyohara | G06V 10/993 |
| 2025/0029577 A1* | 1/2025 | Hwang | G09G 5/10 |
| 2025/0095534 A1* | 3/2025 | Wu | G09G 3/20 |
| 2025/0349237 A1* | 11/2025 | Park | G09G 3/2007 |

* cited by examiner

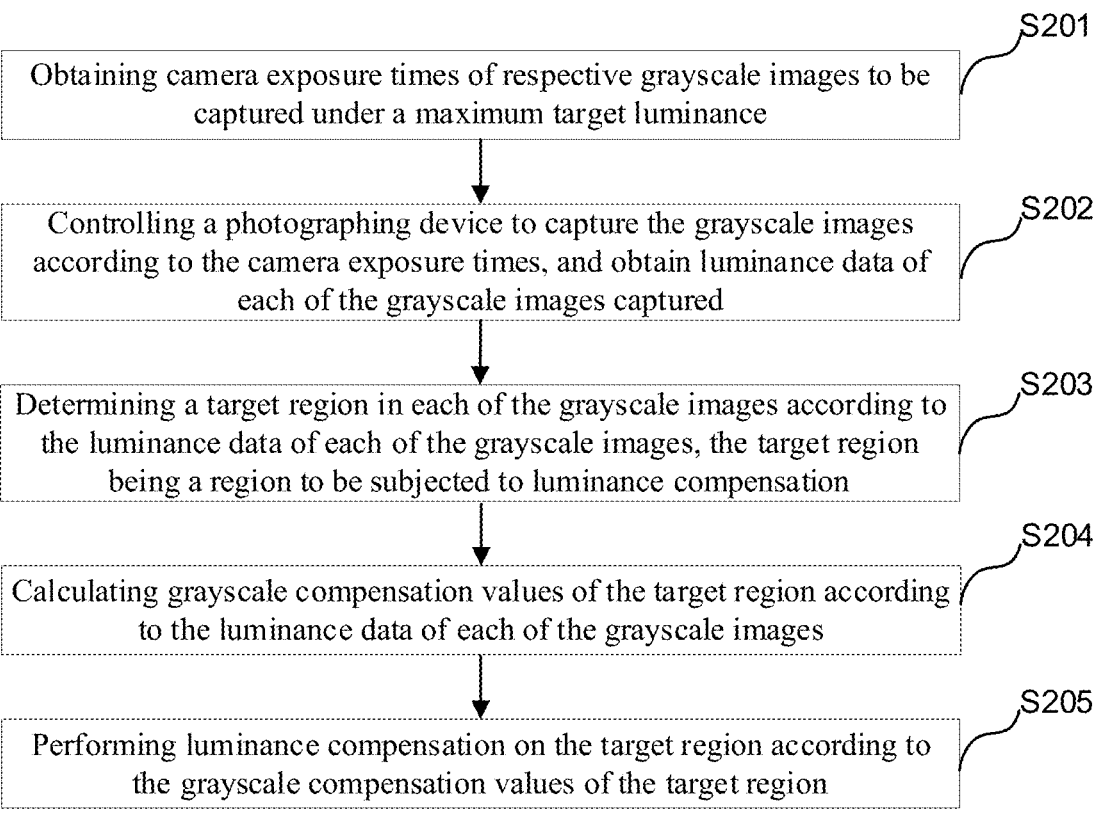

S201

Obtaining camera exposure times of respective grayscale images to be captured under a maximum target luminance

S202

Controlling a photographing device to capture the grayscale images according to the camera exposure times, and obtain luminance data of each of the grayscale images captured

S203

Determining a target region in each of the grayscale images according to the luminance data of each of the grayscale images, the target region being a region to be subjected to luminance compensation

S204

Calculating grayscale compensation values of the target region according to the luminance data of each of the grayscale images

S205

Performing luminance compensation on the target region according to the grayscale compensation values of the target region

FIG. 2

| L10 | L11 | L12 | L13 |
|-----|-----|-----|-----|
| L20 | L21 | L22 | L23 |
| L30 | L31 | L32 | L33 |
| L40 | L41 | L42 | L43 |

FIG. 6

| 3.2 | 4.1 | 2.9 | 3.3 |
|-----|-----|-----|-----|
| 3.1 | 2.6 | 3.5 | 3.1 |
| 4.2 | 3.4 | 2.5 | 2.8 |
| 3.2 | 4.1 | 3.2 | 3.5 |

FIG. 7

| 0.2 | 0.1 | 0.9 | 0.3 |
|-----|-----|-----|-----|
| 0.1 | 0.6 | 0.5 | 0.1 |
| 0.2 | 0.4 | 0.5 | 0.8 |
| 0.2 | 0.1 | 0.2 | 0.5 |

FIG. 8

| | Subpixel1 | Subpixel2 | Subpixel3 | Subpixel4 | Subpixel5 | Subpixel6 | Subpixel7 | Subpixel8 | Subpixel9 | Subpixel10 | Subpixel11 | Subpixel12 | Subpixel13 | Subpixel14 | Subpixel15 | Subpixel16 |
|---|---|---|---|---|---|---|---|---|---|---|---|---|---|---|---|---|
| Line 1 | R10 | R11 | R12 | R13 | R14 | R15 | R16 | R17 | R18 | R19 | R1A | R1B | R1C | R1D | R1E | R1F |
| Line 2 | R10 | R11 | R12 | R13 | R14 | R15 | R16 | R17 | R18 | R19 | R1A | R1B | R1C | R1D | R1E | R1F |
| Line 3 | R10 | R11 | R12 | R13 | R14 | R15 | R16 | R17 | R18 | R19 | R1A | R1B | R1C | R1D | R1E | R1F |
| Line 4 | R10 | R11 | R12 | R13 | R14 | R15 | R16 | R17 | R18 | R19 | R1A | R1B | R1C | R1D | R1E | R1F |
| Line 5 | R10 | R11 | R12 | R13 | R14 | R15 | R16 | R17 | R18 | R19 | R1A | R1B | R1C | R1D | R1E | R1F |
| Line 6 | R10 | R11 | R12 | R13 | R14 | R15 | R16 | R17 | R18 | R19 | R1A | R1B | R1C | R1D | R1E | R1F |
| Line 7 | R10 | R11 | R12 | R13 | R14 | R15 | R16 | R17 | R18 | R19 | R1A | R1B | R1C | R1D | R1E | R1F |
| Line 8 | R10 | R11 | R12 | R13 | R14 | R15 | R16 | R17 | R18 | R19 | R1A | R1B | R1C | R1D | R1E | R1F |
| Line 9 | R10 | R11 | R12 | R13 | R14 | R15 | R16 | R17 | R18 | R19 | R1A | R1B | R1C | R1D | R1E | R1F |
| Line 10 | R10 | R11 | R12 | R13 | R14 | R15 | R16 | R17 | R18 | R19 | R1A | R1B | R1C | R1D | R1E | R1F |
| Line 11 | R10 | R11 | R12 | R13 | R14 | R15 | R16 | R17 | R18 | R19 | R1A | R1B | R1C | R1D | R1E | R1F |
| Line 12 | R10 | R11 | R12 | R13 | R14 | R15 | R16 | R17 | R18 | R19 | R1A | R1B | R1C | R1D | R1E | R1F |
| Line 13 | R10 | R11 | R12 | R13 | R14 | R15 | R16 | R17 | R18 | R19 | R1A | R1B | R1C | R1D | R1E | R1F |
| Line 14 | R10 | R11 | R12 | R13 | R14 | R15 | R16 | R17 | R18 | R19 | R1A | R1B | R1C | R1D | R1E | R1F |
| Line 15 | R10 | R11 | R12 | R13 | R14 | R15 | R16 | R17 | R18 | R19 | R1A | R1B | R1C | R1D | R1E | R1F |
| Line 16 | R10 | R11 | R12 | R13 | R14 | R15 | R16 | R17 | R18 | R19 | R1A | R1B | R1C | R1D | R1E | R1F |

FIG. 9

| | Subpixel 1 | Subpixel 2 | Subpixel 3 | Subpixel 4 | Subpixel 5 | Subpixel 6 | Subpixel 7 | Subpixel 8 | Subpixel 9 | Subpixel 10 | Subpixel 11 | Subpixel 12 | Subpixel 13 | Subpixel 14 | Subpixel 15 | Subpixel 16 |
|---|---|---|---|---|---|---|---|---|---|---|---|---|---|---|---|---|
| Line 1 | R10 | R11 | R12 | R13 | R14 | R15 | R16 | R17 | R18 | R19 | R1A | R1B | R1C | R1D | R1E | R1F |
| Line 2 | R10 | R11 | R12 | R13 | R14 | R15 | R16 | R17 | R18 | R19 | R1A | R1B | R1C | R1D | R1E | R1F |
| Line 3 | R10 | R11 | R12 | R13 | R14 | R15 | R16 | R17 | R18 | R19 | R1A | R1B | R1C | R1D | R1E | R1F |
| Line 4 | R10 | R11 | R12 | R13 | R14 | R15 | R16 | R17 | R18 | R19 | R1A | R1B | R1C | R1D | R1E | R1F |
| Line 5 | R10 | R11 | R12 | R13 | R14 | R15 | R16 | R17 | R18 | R19 | R1A | R1B | R1C | R1D | R1E | R1F |
| Line 6 | R10 | R11 | R12 | R13 | R14 | R15 | R16 | R17 | R18 | R19 | R1A | R1B | R1C | R1D | R1E | R1F |
| Line 7 | R10 | R11 | R12 | R13 | R14 | R15 | R16 | R17 | R18 | R19 | R1A | R1B | R1C | R1D | R1E | R1F |
| Line 8 | R10 | R11 | R12 | R13 | R14 | R15 | R16 | R17 | R18 | R19 | R1A | R1B | R1C | R1D | R1E | R1F |
| Line 9 | R10 | R11 | R12 | R13 | R14 | R15 | R16 | R17 | R18 | R19 | R1A | R1B | R1C | R1D | R1E | R1F |
| Line 10 | R10 | R11 | R12 | R13 | R14 | R15 | R16 | R17 | R18 | R19 | R1A | R1B | R1C | R1D | R1E | R1F |
| Line 11 | R10 | R11 | R12 | R13 | R14 | R15 | R16 | R17 | R18 | R19 | R1A | R1B | R1C | R1D | R1E | R1F |
| Line 12 | R10 | R11 | R12 | R13 | R14 | R15 | R16 | R17 | R18 | R19 | R1A | R1B | R1C | R1D | R1E | R1F |
| Line 13 | R10 | R11 | R12 | R13 | R14 | R15 | R16 | R17 | R18 | R19 | R1A | R1B | R1C | R1D | R1E | R1F |
| Line 14 | R10 | R11 | R12 | R13 | R14 | R15 | R16 | R17 | R18 | R19 | R1A | R1B | R1C | R1D | R1E | R1F |
| Line 15 | R10 | R11 | R12 | R13 | R14 | R15 | R16 | R17 | R18 | R19 | R1A | R1B | R1C | R1D | R1E | R1F |
| Line 16 | R10 | R11 | R12 | R13 | R14 | R15 | R16 | R17 | R18 | R19 | R1A | R1B | R1C | R1D | R1E | R1F |

FIG. 10

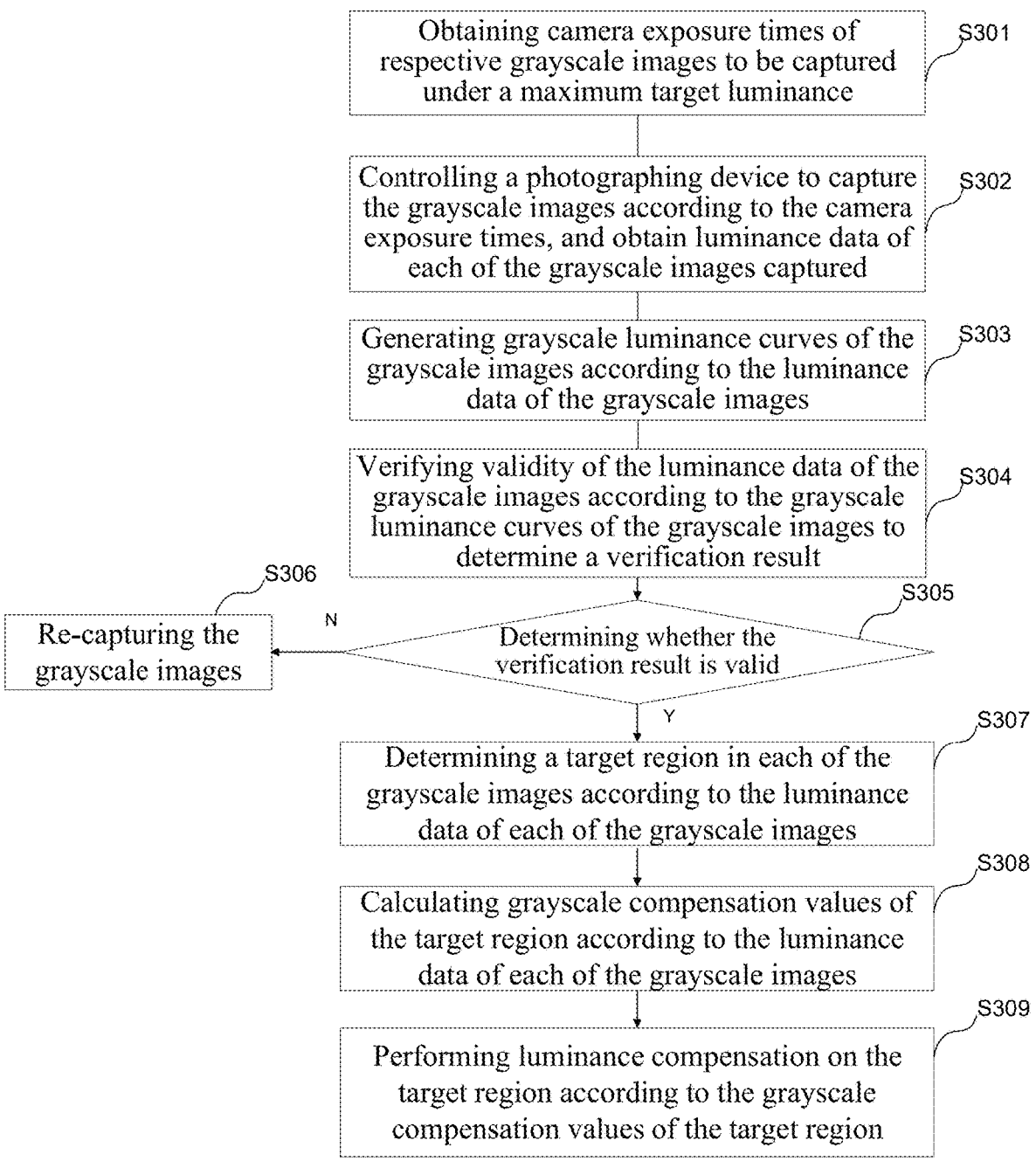

Obtaining camera exposure times of respective grayscale images to be captured under a maximum target luminance — S301

Controlling a photographing device to capture the grayscale images according to the camera exposure times, and obtain luminance data of each of the grayscale images captured — S302

Generating grayscale luminance curves of the grayscale images according to the luminance data of the grayscale images — S303

Verifying validity of the luminance data of the grayscale images according to the grayscale luminance curves of the grayscale images to determine a verification result — S304

S306 — Re-capturing the grayscale images

N

Determining whether the verification result is valid — S305

Y

Determining a target region in each of the grayscale images according to the luminance data of each of the grayscale images — S307

Calculating grayscale compensation values of the target region according to the luminance data of each of the grayscale images — S308

Performing luminance compensation on the target region according to the grayscale compensation values of the target region — S309

FIG. 11

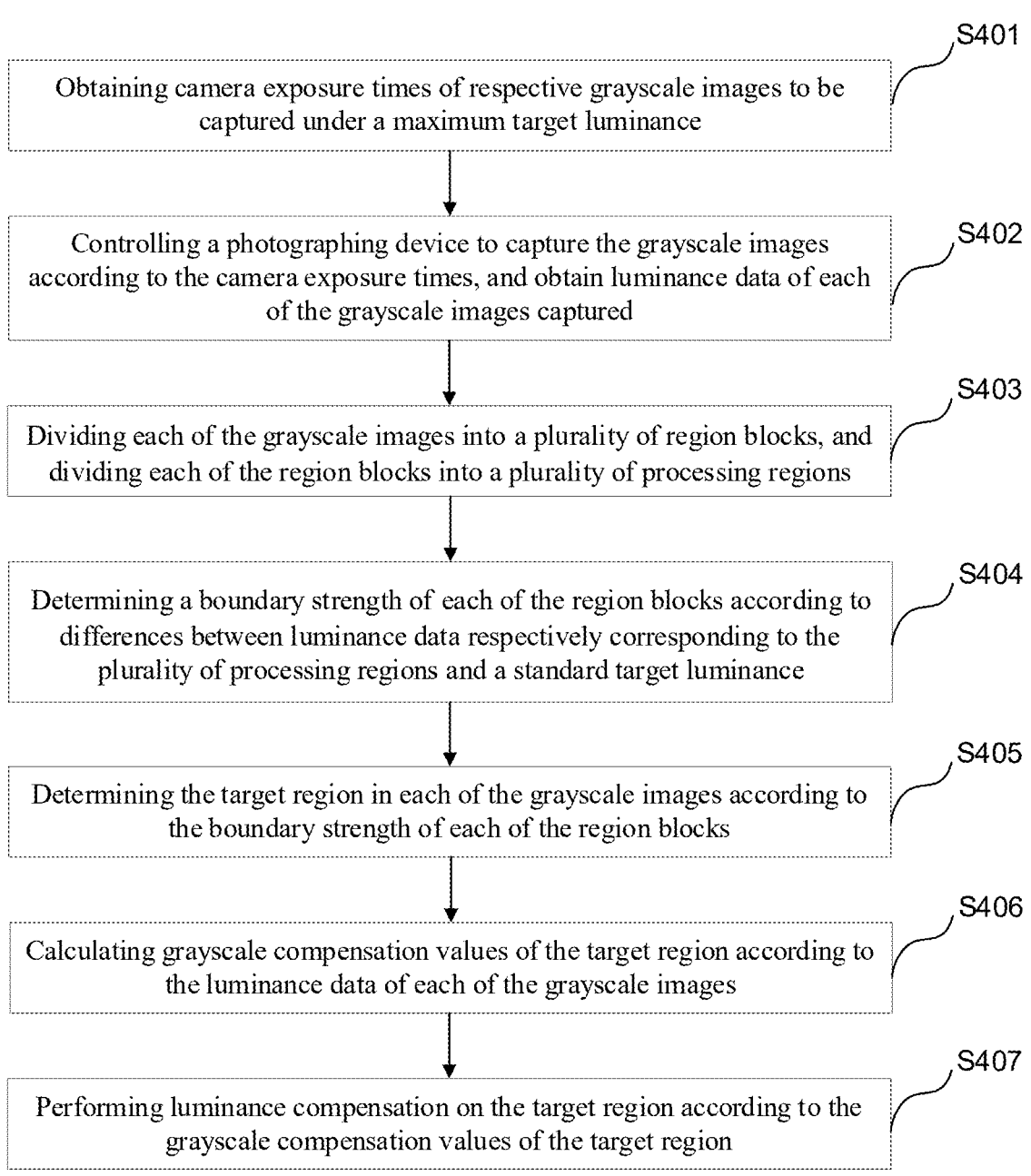

Obtaining camera exposure times of respective grayscale images to be captured under a maximum target luminance ⟋S401

Controlling a photographing device to capture the grayscale images according to the camera exposure times, and obtain luminance data of each of the grayscale images captured ⟋S402

Dividing each of the grayscale images into a plurality of region blocks, and dividing each of the region blocks into a plurality of processing regions ⟋S403

Determining a boundary strength of each of the region blocks according to differences between luminance data respectively corresponding to the plurality of processing regions and a standard target luminance ⟋S404

Determining the target region in each of the grayscale images according to the boundary strength of each of the region blocks ⟋S405

Calculating grayscale compensation values of the target region according to the luminance data of each of the grayscale images ⟋S406

Performing luminance compensation on the target region according to the grayscale compensation values of the target region ⟋S407

FIG. 12

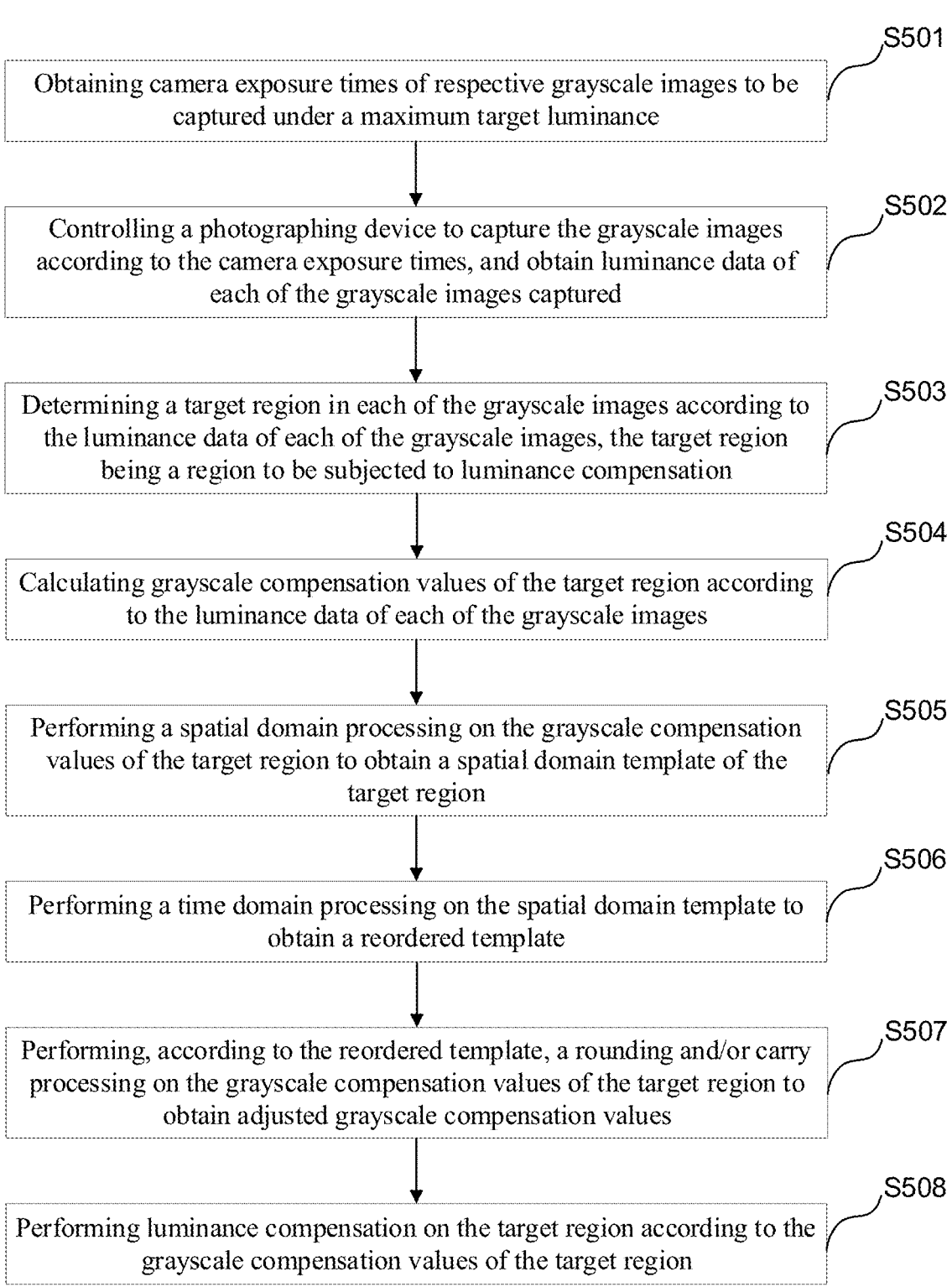

S501

Obtaining camera exposure times of respective grayscale images to be captured under a maximum target luminance

S502

Controlling a photographing device to capture the grayscale images according to the camera exposure times, and obtain luminance data of each of the grayscale images captured

S503

Determining a target region in each of the grayscale images according to the luminance data of each of the grayscale images, the target region being a region to be subjected to luminance compensation

S504

Calculating grayscale compensation values of the target region according to the luminance data of each of the grayscale images

S505

Performing a spatial domain processing on the grayscale compensation values of the target region to obtain a spatial domain template of the target region

S506

Performing a time domain processing on the spatial domain template to obtain a reordered template

S507

Performing, according to the reordered template, a rounding and/or carry processing on the grayscale compensation values of the target region to obtain adjusted grayscale compensation values

S508

Performing luminance compensation on the target region according to the grayscale compensation values of the target region

FIG. 13

IMAGE DISPLAY LUMINANCE COMPENSATION METHOD, COMPUTER DEVICE, AND STORAGE MEDIUM

CROSS-REFERENCE TO RELATED APPLICATIONS

The present disclosure claims priority to Chinese patent application No. 202411268804X, filed on Sep. 10, 2024, the entire content of which is incorporated herein by reference.

TECHNICAL FIELD

The present disclosure relates to the field of image display technologies, and in particular, to an image display luminance compensation method, a computer device, and a storage medium.

BACKGROUND

Active-matrix organic light-emitting diode (AMOLED) screens are characterized by wide color gamut, wide viewing angle, and independent light emission, and are widely used in the field of image display. In order to eliminate the uneven display luminance of the AMOLED screen caused by the manufacturing process, an image display luminance compensation algorithm is generally used to compensate the display luminance of the AMOLED screen.

In the related art, the image display luminance compensation algorithm is mainly aimed at compensating a display brightness value (DBV) in a normal mode. The compensation of the low grayscale image display luminance in an ultra-low DBV mode is more complicated, and an effect of using the existing image display luminance compensation algorithm to perform luminance compensation on the low grayscale in the ultra-low DBV mode is relatively poor.

SUMMARY

In a first aspect, the present disclosure provides an image display luminance compensation method, including:

obtaining camera exposure times of respective grayscale images to be captured under a maximum target luminance;

controlling a photographing device to capture the grayscale images according to the camera exposure times, and obtaining luminance data of each of the grayscale images captured;

determining a target region in each of the grayscale images according to the luminance data of each of the grayscale images, the target region being a region to be subjected to luminance compensation;

calculating grayscale compensation values of the target region according to the luminance data of each of the grayscale images; and performing luminance compensation on the target region according to the grayscale compensation values of the target region.

In an embodiment, after obtaining the luminance data of each of the grayscale images captured, the method further includes:

generating grayscale luminance curves of the grayscale images according to the luminance data of the grayscale images;

verifying validity of the luminance data of the grayscale images according to the grayscale luminance curves of the grayscale images to determine a verification result;

performing the step of determining the target region in each of the grayscale images according to the luminance data of each of the grayscale images when the verification result is valid; and re-capturing the grayscale images when the verification result is invalid.

In an embodiment, verifying the validity of the luminance data of the grayscale images according to the grayscale luminance curves of the grayscale images to determine the verification result includes:

determining that the verification result of the validity of the luminance data is valid when the grayscale luminance curves of the grayscale images do not intersect with each other; and determining that the verification result of the validity of the luminance data is invalid when the grayscale luminance curves of any two grayscale images intersect with each other.

In an embodiment, determining the target region in each of the grayscale images according to the luminance data of each of the grayscale images includes:

dividing each of the grayscale images into a plurality of region blocks, and dividing each of the region blocks into a plurality of processing regions;

determining a boundary strength of each of the region blocks according to differences between luminance data respectively corresponding to the plurality of processing regions and a standard target luminance; and determining the target region in each of the grayscale images according to the boundary strength of each of the region blocks.

In an embodiment, the standard target luminance is an average luminance of pixels in a central region of a region block corresponding to each processing region.

In an embodiment, each processing region includes a plurality of pixel sub-regions, and after dividing each of the grayscale images into the plurality of region blocks, and dividing each of the region blocks into the plurality of processing regions, the method further includes:

determining an average value of the luminance data of the plurality of pixel sub-regions in each processing region; and subtracting the average value of each processing region from a corresponding standard target luminance to obtain a difference between the luminance data corresponding to each processing region and the standard target brightness.

In an embodiment, determining the boundary strength of each of the region blocks according to the differences between the luminance data respectively corresponding to the plurality of processing regions and the standard target luminance includes: comparing the differences between the luminance data respectively corresponding to the plurality of processing regions and the standard target luminance with a target standard luminance error threshold respectively to obtain the boundary strength of each of the region blocks.

In an embodiment, comparing the differences between the luminance data respectively corresponding to the plurality of processing regions and the standard target luminance with a target standard luminance error threshold respectively to obtain the boundary strength of each of the region blocks includes: increasing, when the difference between the luminance data corresponding to the processing region and the standard target luminance is greater than the target standard luminance error threshold, an initial boundary strength of the region block corresponding to the processing region by a first preset value until all processing regions in the region block are traversed to obtain the boundary strength of each of the region blocks.

In an embodiment, determining the target region in each of the grayscale images according to the boundary strength of each of the region blocks includes: taking the region block as the target region when the boundary strength of the region block is greater than a second preset value.

In an embodiment, performing the luminance compensation on the target region according to the grayscale compensation values of the target region includes:

performing a spatial domain processing on the grayscale compensation values of the target region to obtain a spatial domain template of the target region;

performing a time domain processing on the spatial domain template to obtain a reordered template;

performing, according to the reordered template, a rounding and/or carry processing on the grayscale compensation values of the target region to obtain adjusted grayscale compensation values; and performing the luminance compensation on the target region according to the adjusted grayscale compensation values.

In an embodiment, performing the spatial domain processing on the grayscale compensation values of the target region to obtain the spatial domain template of the target region includes:

determining grayscale compensation values respectively corresponding to a plurality of pixel sub-regions of the target region from the grayscale compensation values of the target region;

performing a summation processing on decimal parts of the grayscale compensation values respectively corresponding to the plurality of pixel sub-regions to obtain an initial weight;

determining a spatial domain weight of the target region according to a weight value range of the initial weight; and generating the spatial domain template according to the spatial domain weight of the target region.

In an embodiment, performing the time domain processing on the spatial domain template to obtain the reordered template includes:

obtaining a preset frame refresh mode; and adjusting a carry position of a spatial domain weight in the spatial domain template according to the preset frame refresh mode to obtain the reordered template.

In an embodiment, the luminance data of each of the grayscale images includes luminance data of a plurality of pixels, and calculating the grayscale compensation values of the target region according to the luminance data of each of the grayscale images includes: solving a preset grayscale-luminance relationship curve function according to the luminance data of the plurality of pixels in each of the grayscale images to determine relationship parameters in the grayscale-luminance relationship curve; generating a grayscale difference function according to the relationship parameters in the grayscale-luminance relationship curve; inputting the luminance data of the plurality of pixels in each of the grayscale images and standard luminance data corresponding to each of the grayscale images into the grayscale difference function to obtain the grayscale compensation values of the pixels in the target region.

In an embodiment, the standard luminance data is an average value of luminance data of a central region of the corresponding grayscale image.

In a second aspect, the present disclosure provides an image display luminance compensation apparatus, including:

an obtaining module configured to obtain camera exposure times of respective grayscale images to be captured under a maximum target luminance, and control a photographing device to capture the grayscale images according to the camera exposure times, and obtain luminance data of each of the grayscale images captured;

a filtering module configured to determine a target region in each of the grayscale images according to the luminance data of each of the grayscale images, the target region being a region to be subjected to luminance compensation; and a compensation module configured to calculate grayscale compensation values of the target region according to the luminance data of each of the grayscale images, and perform luminance compensation on the target region according to the grayscale compensation values of the target region.

In an embodiment, the filtering module is further configured to: generate grayscale luminance curves of the grayscale images according to the luminance data of the grayscale images; verify validity of the luminance data of the grayscale images according to the grayscale luminance curves of the grayscale images to determine a verification result; perform the step of determining the target region in each of the grayscale images according to the luminance data of each of the grayscale images when the verification result is valid; and re-capture the grayscale images when the verification result is invalid.

In an embodiment, the filtering module is further configured to: determine that the verification result of the validity of the luminance data is valid when the grayscale luminance curves of the grayscale images do not intersect with each other; and determine that the verification result of the validity of the luminance data is invalid when the grayscale luminance curves of any two grayscale images intersect with each other.

In an embodiment, the filtering module is further configured to: divide each of the grayscale images into a plurality of region blocks, and divide each of the region blocks into a plurality of processing regions; determine a boundary strength of each of the region blocks according to differences between luminance data respectively corresponding to the plurality of processing regions and a standard target luminance; and determine the target region in each of the grayscale images according to the boundary strength of each of the region blocks.

In an embodiment, the standard target luminance is an average luminance of pixels in a central region of a region block corresponding to each processing region.

In an embodiment, the compensation module is further configured to: perform a spatial domain processing on the grayscale compensation values of the target region to obtain a spatial domain template of the target region; perform a time domain processing on the spatial domain template to obtain a reordered template; perform, according to the reordered template, a rounding and/or carry processing on the grayscale compensation values of the target region to obtain adjusted grayscale compensation values; and perform the luminance compensation on the target region according to the adjusted grayscale compensation values.

In an embodiment, the compensation module is further configured to: determine grayscale compensation values respectively corresponding to a plurality of pixel sub-regions of the target region from the grayscale compensation values of the target region; perform a summation processing on decimal parts of the grayscale compensation values respectively corresponding to the plurality of pixel sub-regions to obtain an initial weight; determine a spatial domain weight of the target region according to a weight value range of the initial weight; and generate the spatial domain template according to the spatial domain weight of the target region.

In an embodiment, the compensation module is further configured to: obtain a preset frame refresh mode; and adjust a carry position of a spatial domain weight in the spatial domain template according to the preset frame refresh mode to obtain the reordered template.

In a third aspect, the present disclosure further provides a computer device. The computer device includes a processor and a memory storing a computer program. The processor, when executing the computer program, implements the image display luminance compensation method as described above.

In a fourth aspect, the present disclosure further provides a non-transitory computer-readable storage medium having a computer program stored therein. When the computer program is executed by a processor, the image display luminance compensation method as described above is implemented.

In a fifth aspect, the present disclosure further provides a computer program product, including a computer program. When the computer program is executed by a processor, the image display luminance compensation method as described above is implemented.

One or more embodiments of the present disclosure will be described in detail below with reference to drawings. Other features, objects and advantages of the present disclosure will become more apparent from the description, drawings, and claims.

BRIEF DESCRIPTION OF THE DRAWINGS

In order to describe the technical solutions of the embodiments of the present disclosure or the related art more clearly, the accompanying drawings required for describing the embodiments of the present disclosure or for describing the related art will be briefly introduced as follows. Apparently, the accompanying drawings, in the following description, illustrate merely some embodiments of the present disclosure, for a person of ordinary skill in the art, other drawings can also be obtained according to these accompanying drawings without making any creative efforts.

FIG. 2 is a schematic flowchart of an image display luminance compensation method according to embodiments of the present disclosure.

FIG. 6 is a schematic diagram illustrating luminance data according to embodiments of the present disclosure.

FIG. 7 is a schematic diagram illustrating grayscale compensation values of a target region according to embodiments of the present disclosure.

FIG. 8 is a schematic diagram illustrating decimal parts of grayscale compensation values of a target region according to embodiments of the present disclosure.

FIG. 9 is a schematic diagram illustrating a spatial domain template according to embodiments of the present disclosure.

FIG. 10 is a schematic diagram illustrating another spatial domain template according to embodiments of the present disclosure.

FIG. 11 is a schematic flowchart of another image display luminance compensation method according to embodiments of the present disclosure.

FIG. 12 is a schematic flowchart of another image display luminance compensation method according to embodiments of the present disclosure.

FIG. 13 is schematic flowchart of another image display luminance compensation method according to embodiments of the present disclosure.

DETAILED DESCRIPTION OF THE EMBODIMENTS

Figure 1:
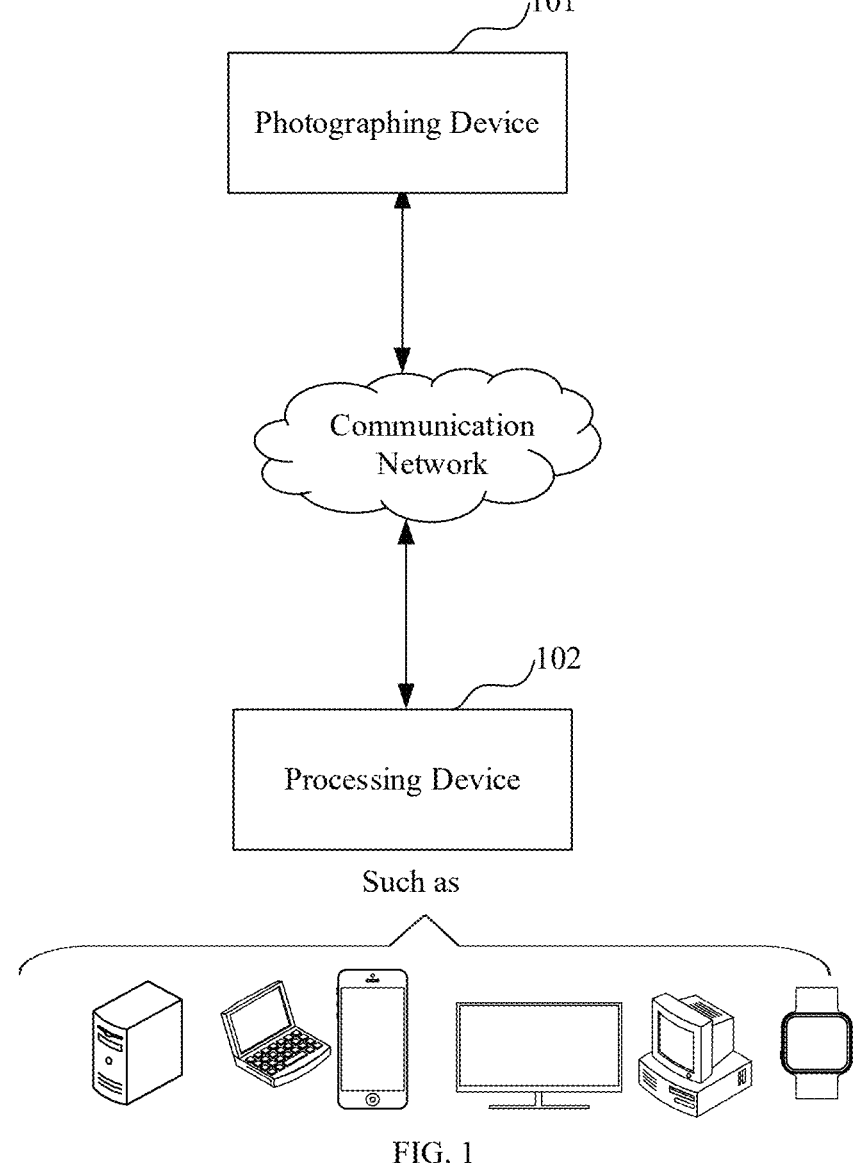
FIG. 1 is a diagram illustrating an application environment of an image display luminance compensation method according to embodiments of the present disclosure.

In order to make the objectives, technical solutions and advantages of the present disclosure more clearly understood, the present disclosure will be further described in detail with the accompanying drawings and embodiments. It should be understood that the specific embodiments described herein are only used to explain the present disclosure and not to limit the present disclosure.

The related art is described in advance as follows.

Active-matrix organic light-emitting diode (AMOLED) screens have the characteristics of wide color gamut, wide viewing angle, and independent light emission, and are widely used in the field of image display. However, in the manufacturing process of the AMOLED screens, due to the unevenness of amorphous silicon (A-SI), the unstable air pressure in an annealing chamber during the electron beam evaporation (ELA) stage, the interference between parallel and scanning directions caused by an optical system, the formation of CVD films, platform vibration and other factors, a large number of uneven display luminance (Mura) defects may be introduced into the AMOLED screen.

In order to eliminate the uneven display luminance of the AMOLED screen caused by the manufacturing process, an image display luminance compensation algorithm is generally used to compensate the display luminance of the AMOLED screen. The compensation for Mura depends on the display luminance. Generally, the conduction of pixels in the AMOLED screen is controlled by a metal-oxide-semiconductor field-effect transistor (MOSFET) device. The MOSFET device operates in a saturation region, and an on-current of the MOSFET is affected by a threshold voltage. As the display luminance decreases, the MOSFET device corresponding to the pixels in the AMOLED screen enters a critical state between the saturation region and a linear region, so an unstable display effect may occur, resulting in serious color cast and split screen phenomena on the AMOLED screen.

In the related art, the image display luminance compensation algorithm is mainly aimed at compensating a display brightness value (DBV) in a normal mode. The compensation of the low grayscale image display luminance in an ultra-low DBV mode is more complicated, and an effect of using the current image display luminance compensation algorithm to perform luminance compensation on the low grayscale in the ultra-low DBV mode is relatively poor.

To address the above technical problems, the embodiments of the present disclosure provide an image display luminance compensation method and apparatus, a device, a storage medium and a program product, which do not calculate grayscale compensation values for all regions in a grayscale image, but only calculates grayscale compensation values for a target region in the grayscale image that needs luminance compensation, and performs luminance compensation protection on a region that does not need luminance compensation, thereby avoiding the problem of worsening luminance with more compensation, and improving the luminance compensation effect.

The following describes an application environment of the image display luminance compensation method.

The image display luminance compensation method according to embodiments of the present disclosure may be applied to an application environment shown in FIG. 1. A photographing device 101 communicates with a processing device 102. A data storage system may store data that the processing device 102 needs to process. The data storage system may be integrated on the processing device 102, or may be placed on a cloud or other network servers.

The processing device 102 may first obtain camera exposure times of respective grayscale images to be captured under a maximum target luminance, control the photographing device 101 to capture the grayscale images according to the camera exposure times, and obtain luminance data of each of the grayscale images captured. Then, the processing device 102 may determine a target region in each of the grayscale images according to the luminance data of each of the grayscale images. The target region is a region to be subjected to luminance compensation. Further, the processing device 102 may calculate grayscale compensation values of the target region according to the luminance data of each of the grayscale images. Furthermore, the processing device 102 may perform luminance compensation on the target region according to the grayscale compensation values of the target region.

The photographing device 101 may be a camera, a video camera, or the like. The processing device 102 may be a terminal or a server. The terminal may be, but is not limited to, various personal computers, laptops, smart phones, tablet computers, IoT (Internet of Things) devices, or portable wearable devices. The IoT device may be a smart speaker, a smart TV, a smart air conditioner, a smart car device, a projection device, or the like. The portable wearable device may be a smart watch, a smart bracelet, a head-mounted device, or the like. The head-mounted device may be a virtual reality (VR) device, an augmented reality (AR) device, a smart glass, or the like. The server may be an independent physical server, a server cluster or distributed system consisting of a plurality of physical servers, or a cloud server that provides a cloud computing service.

In an exemplary embodiment, as shown in FIG. 2, an image display luminance compensation method is provided. Taking the method applied to the processing device in FIG. 1 as an example for illustration, the method includes the following steps S201 to S205.

In the step S201, camera exposure times of respective grayscale images to be captured under a maximum target luminance are obtained.

In the present disclosure, before performing display luminance compensation on the image, the processing device needs to first capture the grayscale images, and determine grayscale compensation values of each display grayscale based on luminance data of each of the grayscale images, so as to use the grayscale compensation values for luminance compensation.

The camera exposure time of each of the grayscale images to be captured is a preset exposure parameter of the photographing device, which may be specified by a user or generated by estimated luminance or display grayscale of the grayscale image. The lower the estimated luminance or the display grayscale of the grayscale image is, the longer the camera exposure time of the grayscale image to be captured is.

In some embodiments, three camera exposure times generally need to be set for the display grayscale corresponding to each of the grayscale images, and each camera exposure time corresponds to a color channel. Exemplarily, if the display grayscales corresponding to the grayscale images to be captured are [16, 32, 96, 160, 192, 224], respectively, and each display grayscale includes three color channels R/G/B, the processing device may obtain 18 camera exposure times.

It should be understood that the above-mentioned maximum target luminance may be specifically set according to an actual condition. Exemplarily, the maximum target luminance may be 10 nits. In other words, the display screen corresponding to the grayscale image is in a low display mode.

In the step S202, a photographing device is controlled to capture the grayscale images according to the camera exposure times, and luminance data of each of the grayscale images captured are obtained.

In this step, after obtaining the camera exposure times of the grayscale images to be captured under the maximum target luminance, the processing device may control the photographing device to capture the grayscale images according to the camera exposure times, and obtain the luminance data of each of the grayscale images captured.

The luminance data of the grayscale image includes luminance data of a plurality of pixels in the grayscale image.

In some embodiments, different grayscale images correspond to different display grayscales. Exemplarily, the plurality of grayscale images may correspond to a plurality of display grayscales such as 16, 32, 96, 160, 192, and 224, respectively. Since each grayscale is divided into three color channels of R, G, and B, accordingly, when photographing the grayscale image of each display grayscale, the luminance data corresponding to the three color channels of R/G/B may be obtained respectively.

In some embodiments, after obtaining the luminance data of the grayscale images, the processing device may generate grayscale luminance curves of the grayscale images according to the luminance data of the grayscale images. Subsequently, the processing device verifies validity of the luminance data of the grayscale images according to the grayscale luminance curves of the grayscale images to determine a verification result. When the verification result is valid, the processing device continues to perform the step of determining the target region in each of the grayscale images according to the luminance data of each of the grayscale images. When the verification result is invalid, the processing device re-captures the grayscale images.

Exemplarily, when the grayscale luminance curves of the grayscale images do not intersect, the processing device may determine that the verification result of the validity of the luminance data is valid. When the grayscale luminance curves of any two grayscale images intersect, the processing device may determine that the verification result of the validity of the luminance data is invalid.

Figure 3:
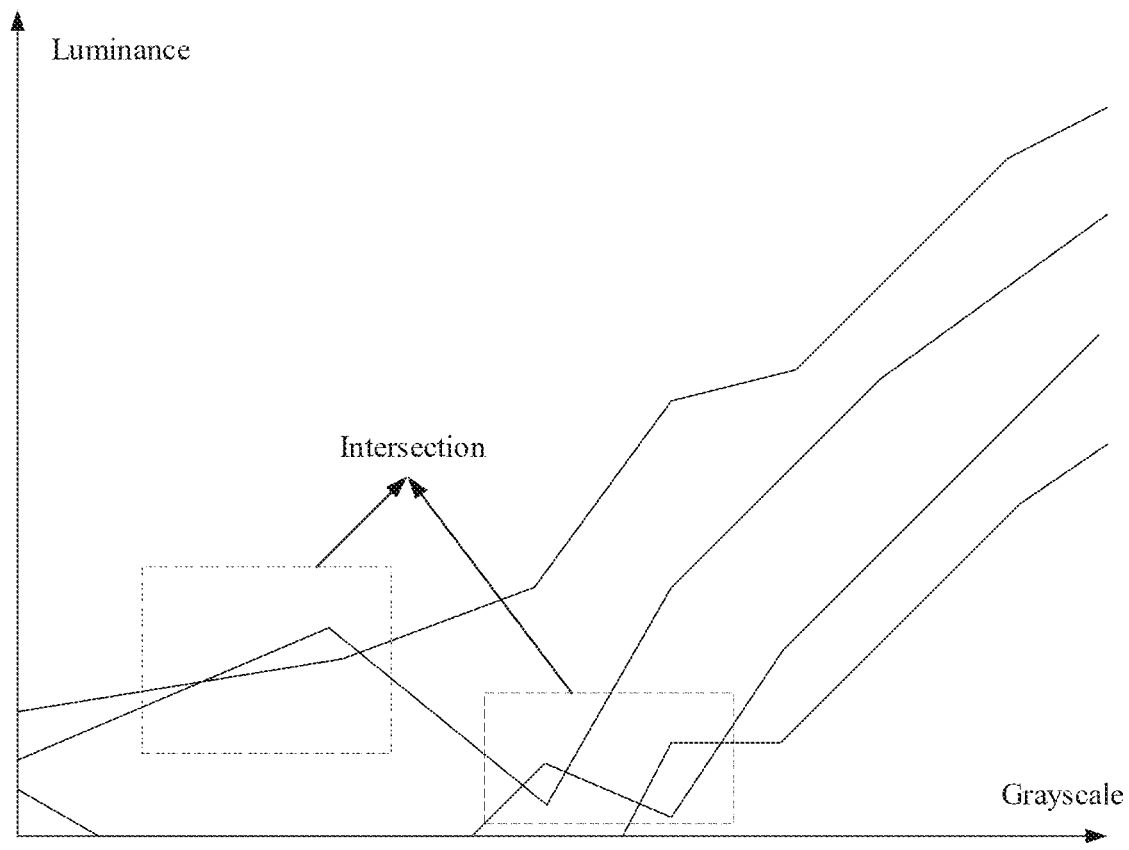
FIG. 3 is a diagram illustrating grayscale luminance curves of respective grayscale images according to embodiments of the present disclosure.
Figures 4, 5:
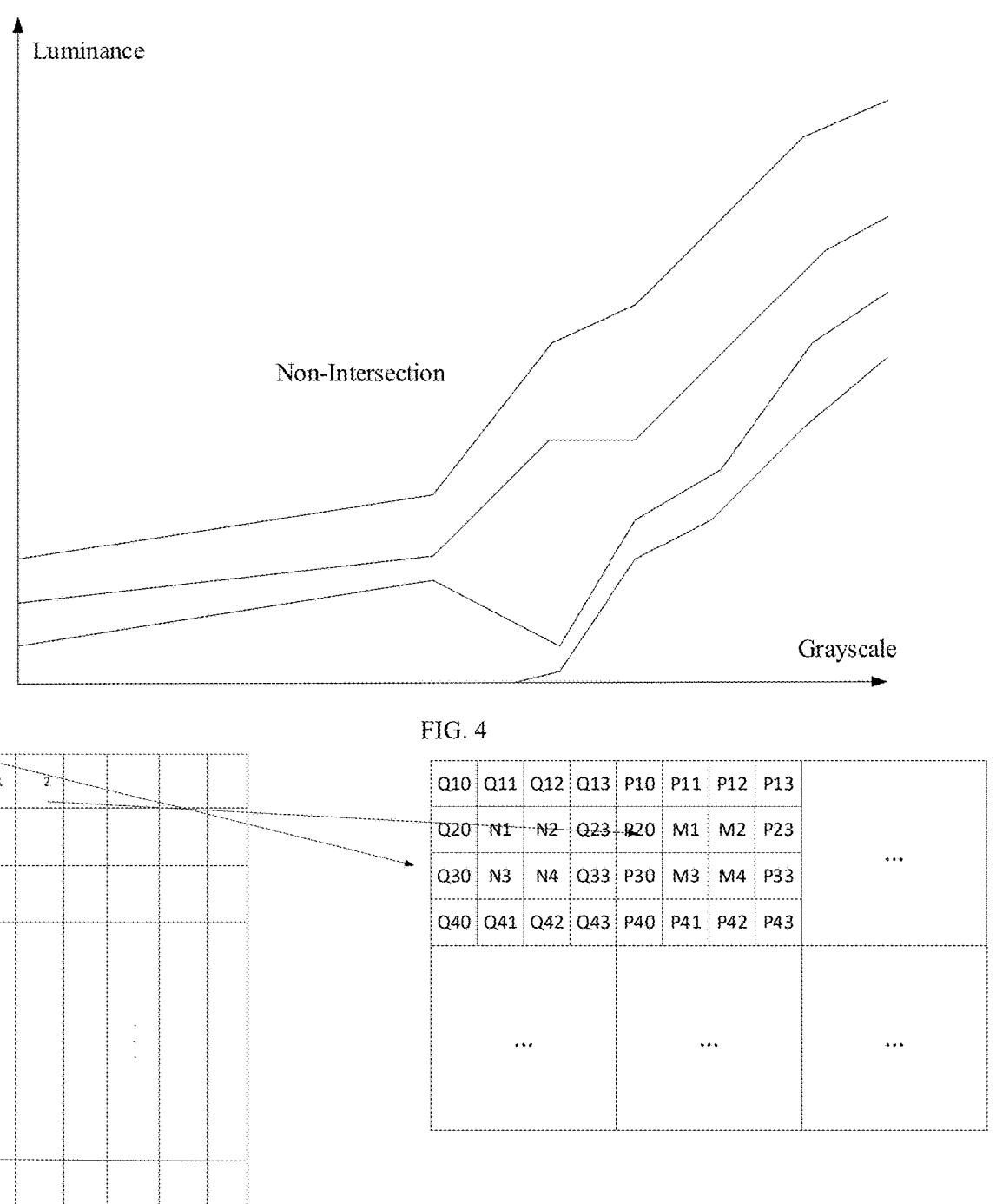
FIG. 4 is a diagram illustrating grayscale luminance curves of respective grayscale images according to embodiments of the present disclosure.
FIG. 5 is a schematic diagram illustrating a division of a screen according to embodiments of the present disclosure.

Exemplarily, FIG. 3 is a diagram illustrating grayscale luminance curves of respective grayscale images according to embodiments of the present disclosure. FIG. 4 is a diagram illustrating grayscale luminance curves of respective grayscale images according to embodiments of the present disclosure. As shown in FIG. 3, the grayscale luminance curves of two or more grayscale images intersect with each other, and thus the verification result of the validity can be determined to be invalid. As shown in FIG. 4, the grayscale luminance curves of any two grayscale images do not intersect with each other, and thus the verification result of the validity can be determined to be valid.

In the step S203, a target region in each of the grayscale images is determined according to the luminance data of each of the grayscale images. The target region is a region to be subjected to luminance compensation.

In this step, after the processing device controls the photographing device to capture the grayscale images according to the camera exposure times and obtains the luminance data of each of the grayscale images, the target region in each of the grayscale images can be determined according to the luminance data of each of the grayscale images.

It should be understood that the above process of determining the target region in each of the grayscale images according to the luminance data of each of the grayscale images is a process of filtering out the region in the grayscale image that does not need to be corrected.

In some embodiments, the processing device may divide each of the grayscale images into a plurality of region blocks, and divide each of the region blocks into a plurality of processing regions. Then, the processing device may determine a boundary strength of each of the region blocks according to differences between luminance data respectively corresponding to the plurality of processing regions and a standard target luminance. Further, the processing device may determine the target region in each of the grayscale images according to the boundary strength of each of the region blocks.

It should be understood that the above processing region may be a 2×2 region. In other words, each processing region may include four pixel sub-regions. Four processing regions constitute a region block, and four pixel sub-regions at a center position of the region block may constitute a central region.

Exemplarily, FIG. 5 is a schematic diagram illustrating a division of a screen according to embodiments of the present disclosure. As shown in FIG. 5, a screen having 1080×2400 pixels may be divided into a plurality of 4×4 region blocks. Each region block includes four processing regions, each processing region includes four pixel sub-regions, and the central four pixel sub-regions of the region block are a central region of the region block. In other words, the central region of the region block 1 includes four pixel sub-regions N1, N2, N3, and N4, and the central region of the region block 2 includes four pixel sub-regions M1, M2, M3, and M4.

In some embodiments, the standard target luminance is an average luminance of pixels in the central region of the region block corresponding to each processing region.

In some embodiments, the processing device may obtain an average value of the luminance data of all pixel sub-regions in the processing region, and then subtract the average value from the standard target luminance, thereby obtaining a difference between the luminance data corresponding to each processing region and the standard target luminance. Further, the difference between the luminance data corresponding to each processing region and the standard target luminance is compared with a target standard luminance error threshold, so as to obtain the boundary strength of the processing region.

Exemplarily, FIG. 6 is a schematic diagram illustrating luminance data according to embodiments of the present disclosure. Taking the four processing regions in FIG. 6 as an example, the differences between the luminance data corresponding to the four processing regions and the standard target luminance may be denoted as $\Delta B1$, $\Delta B2$, $\Delta B3$, and $\Delta B4$, respectively. The standard target luminance of the region block corresponding to the four processing regions may be denoted as lumitarget. $\Delta B1$ can be determined by using the following formula (1), $\Delta B2$ can be determined by using the following formula (2), $\Delta B3$ can be determined by using the following formula (3), and $\Delta B4$ can be determined by using the following formula (4):

$$\Delta B1 = \frac{(L_{10} + L_{11} + L_{20} + L_{21} - lumi_{target} * 4)}{4}, \tag{1}$$

$$\Delta B2 = \frac{(L_{12} + L_{13} + L_{23} + L_{22} - lumi_{target} * 4)}{4}, \tag{2}$$

$$\Delta B3 = \frac{(L_{30} + L_{41} + L_{40} + L_{31} - lumi_{target} * 4)}{4}, \tag{3}$$

$$\Delta B4 = \frac{(L_{33} + L_{43} + L_{42} + L_{32} - lumi_{target} * 4)}{4}. \tag{4}$$

Exemplarily, if the target standard luminance error threshold is $\Delta T$, the difference $\Delta Bi$ between the luminance data corresponding to each processing region in the region block and the standard target luminance may be compared with the target standard luminance error threshold. If $\Delta Bi$ is greater than $\Delta T$, the boundary strength of the region block is increased by a first preset value. For example, the first preset value is set to 1. An initial value of the boundary strength of the region block is 0. After traversing all processing regions in the region block, the boundary strength of the region block may be obtained. Then the boundary strength is evaluated, and if the boundary strength is equal to a second preset value, for example, the second preset value is set to 0, it indicates that the luminance of the plurality of processing regions in the region block is close to the target standard luminance, and there is no need to perform a luminance compensation operation on the region block. If the boundary strength is greater than 0 (i.e., the second preset value), it indicates that the luminance of the plurality of processing regions in the region block is greatly different from the target standard luminance and a luminance compensation operation needs to be performed on the region block, and the region block is determined as the target region.

In the step S204, grayscale compensation values of the target region are calculated according to the luminance data of each of the grayscale images.

In this step, after obtaining the luminance data of the plurality of grayscale images captured under the target photographing luminance, the processing device may determine the grayscale compensation values of the pixels corresponding to different display grayscales according to the luminance data of the plurality of grayscale images.

The luminance data of the grayscale image includes the luminance data of the plurality of pixels in the grayscale image.

In some embodiments, the processing device may first solve a preset grayscale-luminance relationship curve function according to the luminance data of the plurality of pixels in the plurality of grayscale images to determine relationship parameters in the grayscale-luminance relationship curve. Then, the processing device may generate a grayscale difference function according to the relationship parameters in the grayscale-luminance relationship curve, and the processing device may obtain standard luminance data of different display grayscales. Further, the processing device may input the standard luminance data of different display grayscales and the luminance data of the plurality of pixels in the grayscale images corresponding to different display grayscales into the grayscale difference function to solve and obtain the grayscale compensation values of the pixels corresponding to different display grayscales.

The standard luminance data is the luminance data of the central region of the corresponding grayscale image. Exemplarily, the luminance data of the central region may be an average value of the luminance data of 40×40 pixels in the center.

Exemplarily, formula (5) is a set of equations corresponding to the grayscale-luminance relationship curve function. By inputting the display grayscale and the corresponding luminance data of each pixel of the R, G, and B color channels into the formula (5), the relationship parameters gamma1 and b1 in the grayscale-luminance relationship curve may be obtained:

$$\begin{cases} lg(lum1[i]) = gamma1 * lg(gray1[i]) + b1 \\ lg(lumi\_mid[i]) = gamma * lg(gray[i]) + b \end{cases} \quad (5)$$

where gray1[i] is the value of the $i^{th}$ display grayscale, lum1[i] is the luminance data corresponding to the pixel of the $i^{th}$ display grayscale, and $i \in [16, 32, 64, 128, 192, 224]$. The luminance lumi_mid[i] corresponding to the central region of the screen is the luminance data of the central region of the grayscale image.

Exemplarily, the processing device may also solve other relationship parameters gamma and b in the grayscale-luminance relationship curve by inputting the display grayscale of each pixel of the R, G, and B color channels and the corresponding luminance data of the central region into the formula (5).

Exemplarily, after solving and obtaining the relationship parameters in the grayscale-luminance relationship curve, the processing device may construct the grayscale difference function based on the relationship parameters gamma1 and b1, and the grayscale difference function may be denoted as the following formula (6):

$$\nabla gray = {}^{gamma1}\sqrt{\frac{lum\_mid}{10^{b1}}} - gray[i] \quad (6)$$

where $\nabla gray$ is the grayscale compensation value, gamma1 and b1 are the relationship parameters in the grayscale luminance relationship curve, gray1[i] is the value of the $i^{th}$ display grayscale, and $i \in [16, 32, 64, 128, 192, 224]$.

Exemplarily, after generating the grayscale difference function, the processing device may input the standard luminance data of different display grayscales and the luminance data of the plurality of pixels in the grayscale images corresponding to different display grayscales into the grayscale difference function to solve the grayscale compensation values of the pixels corresponding to the different display grayscales.

In some embodiments, when solving the grayscale compensation values of the pixels corresponding to different display grayscales, the solution may be performed with the color channel as the dimension.

Exemplarily, taking the R channel as an example, the standard luminance data of different display grayscales and the luminance data of the plurality of pixels of the R channel corresponding to different display grayscales may be input into the grayscale difference function to obtain the grayscale compensation value $\nabla gray16\_R$ of display grayscale 16, the grayscale compensation value $\nabla gray32\_R$ of display grayscale 32, the grayscale compensation value $\nabla gray96\_R$ of display grayscale 96, the grayscale compensation value $\nabla gray128\_R$ of display grayscale 128, the grayscale compensation value $\nabla gray192\_R$ of display grayscale 192, and the grayscale compensation value $\nabla gray224\_R$ of display grayscale 224.

Exemplarily, taking the G channel as an example, the standard luminance data of different display grayscales and the luminance data of the plurality pixels of the G channel corresponding to different display grayscales may be input into the grayscale difference function to obtain the grayscale compensation value $\nabla gray16\_G$ of display grayscale 16, the grayscale compensation value $\nabla gray32\_G$ of display grayscale 32, the grayscale compensation value $\nabla gray96\_G$ of display grayscale 96, the grayscale compensation value $\nabla gray128\_G$ of display grayscale 128, the grayscale compensation value $\nabla gray192\_G$ of display grayscale 192, and the grayscale compensation value $\nabla gray224\_G$ of display grayscale 224.

In the step S205, luminance compensation is performed on the target region according to the grayscale compensation values of the target region.

In this step, after calculating the grayscale compensation values of the target region according to the luminance data of each of the grayscale images, the processing device may perform the luminance compensation on the target region according to the grayscale compensation values of the target region.

In some embodiments, the processing device may first perform a spatial domain processing on the grayscale compensation values of the target region to obtain a spatial domain template of the target region. Then, the processing device may perform a time domain processing on the spatial domain template to obtain a reordered template. Then, the processing device may perform a rounding and/or carry processing on the grayscale compensation values of the target region according to the reordered template to obtain adjusted grayscale compensation values. Further, the processing device may perform the luminance compensation on the target region according to the adjusted grayscale compensation values.

The following describes how to perform the spatial domain processing and the time domain processing.

In some embodiments, the processing device may determine grayscale compensation values respectively corresponding to a plurality of pixel sub-regions of the target region from the grayscale compensation values of the target region. Then, the processing device may perform a summation processing on decimal parts of the grayscale compensation values corresponding to the plurality of pixel sub-regions to obtain an initial weight, and determine a spatial domain weight of the target region according to a weight value range of the initial weight. Further, the processing device may generate the spatial domain template according to the spatial domain weight of the target region.

Exemplarily, FIG. 7 is a schematic diagram illustrating grayscale compensation values of a target region according to embodiments of the present disclosure, and FIG. 8 is a schematic diagram illustrating decimal parts of grayscale compensation values of the target region according to embodiments of the present disclosure. As shown in FIG. 7 and FIG. 8, the decimal parts of the grayscale compensation values of the target region may be added to obtain the initial weight of 5.7. All the weight value ranges are preset, including the weight value range of $0 < weight \leq 4$, the weight value range of $4 < weight \leq 8$, the weight value range of $8 < weight \leq 12$, and the weight value range of $12 < weight \leq 16$. If the initial weight is within the weight value range of $0 < weight \leq 4$, the spatial domain weight is equal to 4. If the initial weight is within the weight value range of $4 < weight \leq 8$, the spatial domain weight is equal to 8. If the initial weight is within the weight value range of $8 < weight \leq 12$, the spatial domain weight is equal to 12. If the initial weight is within the weight value range of $8 < weight \leq 12$, the spatial domain weight is equal to 12. If the initial weight is within the weight value range of $12 < weight \leq 16$, the spatial domain weight is equal to 16. Since the initial weight is 5.7, the spatial domain weight of the above target region is 8.

Exemplarily, after obtaining the spatial domain weight of the 4×4 target region, 16 frames may be defined as a cycle, and when each frame is displayed, the spatial domain weight corresponding to the 4×4 target region remains unchanged. For example, if the spatial domain weight is 4, 4 out of 16 pixels in the 4×4 region are selected to add 1.

Exemplarily, after the spatial domain weight is determined, the spatial domain template of the 4×4 target region of 16 frames may be generated for the carry, and different pixel positions may be defined for each frame. For example, if the spatial domain weight is 4, it may be defined that only one pixel is displayed in each row and column. If the spatial domain weight is 8, it may be defined that only two pixels are displayed in each row and column. If the spatial domain weight is 12, it may be defined that only three pixels are displayed in each row and column. If the spatial domain weight is 16, it may be defined that only four pixels are displayed in each row and column.

FIG. 9 is a schematic diagram illustrating a spatial domain template according to embodiments of the present disclosure, and FIG. 10 is a schematic diagram illustrating another spatial domain template according to embodiments of the present disclosure. The spatial domain weight of the spatial domain template in FIG. 9 is 8, and the spatial domain weight of the spatial domain template in FIG. 10 is 4. Exemplarily, in the spatial domain template shown in FIG. 9, the target region of the first frame may be a template displayed in the region of line 1 to line 4, and subpixel 1 to subpixel 4. The grayscale position indicates that the integer bit of the grayscale compensation value of the pixel at that position is added by 1, and the white position indicates that the integer bit of the grayscale compensation value of the pixel at that position is directly taken. The display region of the second frame may be a template displayed in the region of line 1 to line 4 and subpixel 5 to subpixel 8, and the display region of the third frame may be a template displayed in the region of line 1 to line 4 and subpixel 9 to subpixel 12. By analogy, the display region of the sixteenth frame may be a template displayed in the region of line 13 to line 16 and subpixel 13 to subpixel 16.

In some embodiments, after completing the spatial domain processing to obtain the spatial domain template of the target region, the time domain processing may be performed on the spatial domain template to obtain the reordered template. The processing device may obtain a preset frame refresh mode. Further, the processing device may adjust a carry position of the spatial domain weight in the spatial domain template according to the preset frame refresh mode to obtain the reordered template.

It should be understood that the time domain processing refers to selecting a fixed frame refresh mode to adjust the carry position of the spatial domain weight in the spatial domain template, and then performing luminance compensation after rearranging.

Exemplarily, according to the reordered template, the rounding and/or carry processing performed on the grayscale compensation values of the target region may be simplified to be processed by using the following formula (7), thereby obtaining the adjusted grayscale compensation values.

$$data\_value = floor(\nabla gray) + dither\_func(x, y, frame) \qquad (7)$$

where data_value is the grayscale compensation value after adjustment, $\nabla$ gray is the grayscale compensation value before adjustment, floor represents rounding down, dither_func represents the time domain and spatial domain processing. x and y are the coordinates of the compensated pixels, which are used to obtain weight carry information and belong to the spatial domain independent variables. frame represents current frame number information, which is used to obtain a loop position in the time domain, and belongs to the time domain independent variable.

In the present disclosure, the error of the decimal part of the grayscale compensation value can be eliminated through the time domain processing and spatial domain processing. Compared with the rounding operation of the grayscale compensation value in the related art, the accuracy of the grayscale compensation value can be improved.

In the image display luminance compensation method according to the embodiments of the present disclosure, the camera exposure time of each of the grayscale images to be captured under the maximum target luminance is first obtained, the photographing device is controlled to capture each of the grayscale images according to the camera exposure time, and the luminance data of each of the grayscale images captured is obtained. Then, the target region in each of the grayscale images is determined according to the luminance data of each of the grayscale images, and the target region is the region to be subjected to luminance compensation. Then, the grayscale compensation values of the target region are calculated according to the luminance data of each of the grayscale images. Further, the luminance compensation is performed on the target region according to the grayscale compensation values of the target region. Since the grayscale compensation values are not calculated for all regions in the grayscale image, but only for the target region in the grayscale image that needs luminance compensation, luminance compensation protection is performed on the region that does not need luminance compensation, thereby avoiding the problem of worsening luminance with more compensation, and improving the luminance compensation effect.

The following describes how to verify the validity of the luminance data of each of the grayscale images. FIG. 11 is a schematic flowchart of another image display luminance compensation method according to embodiments of the present disclosure. As shown in FIG. 11, the image display luminance compensation method includes the following steps S301 to S309:

In the step S301, camera exposure times of respective grayscale images to be captured under a maximum target luminance are obtained.

In the step S302, a photographing device is controlled to capture the grayscale images according to the camera exposure times, and luminance data of each of the grayscale images captured is obtained.

In the step S303, grayscale luminance curves of the grayscale images are generated according to the luminance data of the grayscale images.

In the step S304, validity of the luminance data of the grayscale images is verified according to the grayscale luminance curves of the grayscale images to determine a verification result.

In the step S305, it is determined whether the verification result is valid.

If the verification result is valid, the step S307 is performed. If the verification result is invalid, the step S306 is performed.

In the step S306, the grayscale images are re-captured.

In the step S307, a target region in each of the grayscale images is determined according to the luminance data of each of the grayscale images. The target region is a region to be subjected to luminance compensation.

In the step S308, grayscale compensation values of the target region are calculated according to the luminance data of each of the grayscale images.

In the step S309, luminance compensation is performed on the target region according to the grayscale compensation values of the target region.

In the present disclosure, since the grayscale compensation values are not calculated for all regions in the grayscale image, but only for the target region in the grayscale image that needs luminance compensation, luminance compensation protection is performed on the region that does not need luminance compensation, thereby avoiding the problem of worsening luminance with more compensation, and improving the luminance compensation effect.

The following describes how to determine the target region in each of the grayscale images. FIG. 12 is a schematic flowchart of another image display luminance compensation method according to embodiments of the present disclosure. As shown in FIG. 12, the image display luminance compensation method includes the following steps S401-S407:

In the step S401, camera exposure times of respective grayscale images to be captured under a maximum target luminance are obtained.

In the step S402, a photographing device is controlled to capture the grayscale images according to the camera exposure times, and luminance data of each of the grayscale images captured is obtained.

In the step S403, each of the grayscale images is divided into a plurality of region blocks, and each of the region blocks is divided into a plurality of processing regions.

In the step S404, a boundary strength of each of the region blocks is determined according to differences between luminance data respectively corresponding to the plurality of processing regions and a standard target luminance.

In the step S405, the target region in each of the grayscale images is determined according to the boundary strength of each of the region blocks.

In the step S406, grayscale compensation values of the target region are calculated according to the luminance data of each of the grayscale images.

In the step S407, luminance compensation is performed on the target region according to the grayscale compensation values of the target region.

The following describes how to perform the luminance compensation on the target region. FIG. 13 is a schematic flowchart of another image display luminance compensation method according to embodiments of the present disclosure. As shown in FIG. 13, the image display luminance compensation method includes the following steps S501-S508:

In the step S501, camera exposure times of respective grayscale images to be captured under a maximum target luminance are obtained.

In the step S502, a photographing device is controlled to capture the grayscale images according to the camera exposure times, and luminance data of each of the grayscale images captured is obtained.

In the step S503, a target region in each of the grayscale images is determined according to the luminance data of each of the grayscale images. The target region is a region to be subjected to luminance compensation.

In the step S504, grayscale compensation values of the target region are calculated according to the luminance data of each of the grayscale images.

In the step S505, a spatial domain processing is performed on the grayscale compensation values of the target region to obtain a spatial domain template of the target region.

In the step S506, a time domain processing is performed on the spatial domain template to obtain a reordered template.

In the step S507, a rounding and/or carry processing is performed on the grayscale compensation values of the target region according to the reordered template to obtain adjusted grayscale compensation values.

In the step S508, luminance compensation is performed on the target region according to the adjusted grayscale compensation values.

In the image display luminance compensation method according to the embodiments of the present disclosure, the camera exposure time of each of the grayscale images to be captured under the maximum target luminance is first obtained, the photographing device is controlled to capture each of the grayscale images according to the camera exposure time, and the luminance data of each of the grayscale images captured is obtained. Then, the target region in each of the grayscale images is determined according to the luminance data of each of the grayscale images, and the target region is the region to be subjected to luminance compensation. Then, the grayscale compensation values of the target region are calculated according to the luminance data of each of the grayscale images. Further, the luminance compensation is performed on the target region according to the grayscale compensation values of the target region. Since the grayscale compensation values are not calculated for all regions in the grayscale image, but only for the target region in the grayscale image that needs luminance compensation, luminance compensation protection is performed on the region that does not need luminance compensation, thereby avoiding the problem of worsening luminance with more compensation, and improving the luminance compensation effect.

It should be understood that although the individual steps in the flow diagrams involved of the embodiments as described above are shown sequentially as indicated by arrows, the steps are not necessarily performed sequentially in the order indicated by the arrows. Unless explicitly stated herein, the execution of these steps is not strictly limited in order and these steps can be performed in any other order. Moreover, at least some of the steps in the flow diagrams involved of the embodiments as described above may include a plurality of steps or a plurality of stages that are not necessarily performed at the same time, but may be performed at different times. The order in which these steps or stages are performed is not necessarily sequential, and these steps may be performed alternately or alternately with other steps or at least some of the steps or stages in other steps.

Based on the same inventive concept, embodiments of the present disclosure also provide an image display luminance compensation apparatus for implementing the image display luminance compensation method as described above. The solution to the problem provided by the apparatus is similar to the implementation of the method documented above, so the specific features in the one or more embodiments of the image display luminance compensation apparatus provided below may be understood with reference to the features of the image display luminance compensation method above and will not be repeated here.

Figure 14:
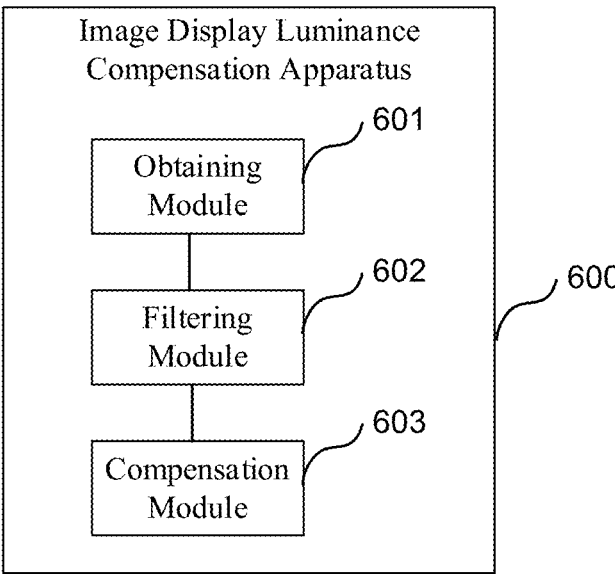
FIG. 14 is a block diagram illustrating a configuration of an image display luminance compensation apparatus according to embodiments of the present disclosure.

In an exemplary embodiment, as shown in FIG. 14, an image display luminance compensation apparatus 600 is provided, including an obtaining module 601, a filtering module 602 and a compensation module 603.

The obtaining module 601 is configured to obtain camera exposure times of respective grayscale images to be captured under a maximum target luminance, and control a photographing device to capture the grayscale images according to the camera exposure times, and obtain luminance data of each of the grayscale images captured.

The filtering module 602 is configured to determine a target region in each of the grayscale images according to the luminance data of each of the grayscale images. The target region is a region to be subjected to luminance compensation.

The compensation module 603 is configured to calculate grayscale compensation values of the target region according to the luminance data of each of the grayscale images, and perform luminance compensation on the target region according to the grayscale compensation values of the target region.

In an embodiment, the filtering module 602 is further configured to: generate grayscale luminance curves of the grayscale images according to the luminance data of the grayscale images; verify validity of the luminance data of the grayscale images according to the grayscale luminance curves of the grayscale images to determine a verification result; perform the step of determining the target region in each of the grayscale images according to the luminance data of each of the grayscale images when the verification result is valid; and re-capture the grayscale images when the verification result is invalid.

In an embodiment, the filtering module 602 is further configured to: determine that the verification result of the validity of the luminance data is valid when the grayscale luminance curves of the grayscale images do not intersect with each other; and determine that the verification result of the validity of the luminance data is invalid when the grayscale luminance curves of any two grayscale images intersect with each other.

In an embodiment, the filtering module 602 is further configured to: divide each of the grayscale images into a plurality of region blocks, and divide each of the region blocks into a plurality of processing regions; determine a boundary strength of each of the region blocks according to differences between luminance data respectively corresponding to the plurality of processing regions and a standard target luminance; and determine the target region in each of the grayscale images according to the boundary strength of each of the region blocks.

In an embodiment, the standard target luminance is an average luminance of pixels in a central region of a region block corresponding to each processing region.

In an embodiment, the compensation module 603 is further configured to: perform a spatial domain processing on the grayscale compensation values of the target region to obtain a spatial domain template of the target region; perform a time domain processing on the spatial domain template to obtain a reordered template; perform, according to the reordered template, a rounding and/or carry processing on the grayscale compensation values of the target region to obtain adjusted grayscale compensation values; and perform the luminance compensation on the target region according to the adjusted grayscale compensation values.

In an embodiment, the compensation module 603 is further configured to: determine grayscale compensation values respectively corresponding to a plurality of pixel sub-regions of the target region from the grayscale compensation values of the target region; perform a summation processing on decimal parts of the grayscale compensation values respectively corresponding to the plurality of pixel sub-regions to obtain an initial weight; determine a spatial domain weight of the target region according to a weight value range of the initial weight; and generate the spatial domain template according to the spatial domain weight of the target region.

In an embodiment, the compensation module 603 is further configured to: obtain a preset frame refresh mode; and adjust a carry position of a spatial domain weight in the spatial domain template according to the preset frame refresh mode to obtain the reordered template.

The individual modules in the above image display luminance compensation apparatus can be implemented in whole or in part by software, hardware and combinations thereof. Each of the above modules may be embedded in hardware form or independent of a processor in a computer device, or may be stored in software form on a memory in the computer device so that the processor can be called to perform the operations corresponding to each of the above modules.

In an exemplary embodiment, a computer device is provided. The computer device may be a processing device. The processing device is a server or a terminal. A diagram illustrating an internal configuration of the computer device may be shown in FIG. 15. The computer device includes a processor, a memory, an input/output (I/O) interface, and a communication interface. The processor, the memory and the input/output interface are connected via a system bus, and the communication interface is connected to the system bus via the input/output interface. The processor of the computer device is configured to provide computing and control capabilities. The memory of the computer device includes a non-transitory storage medium and an internal memory. The non-transitory storage medium stores an operating system, a computer program, and a database. The internal memory provides an environment for the operation of the operating systems and the computer programs in the non-transitory storage medium. The database of the computer device is configured to store data. The input/output interface of the computer device is configured to exchange information between the processor and external devices. The communication interface of the computer device is configured to communicate with external terminals via a network connection. When the computer program is executed by the processor, an image display luminance compensation method is implemented.

Figure 15:
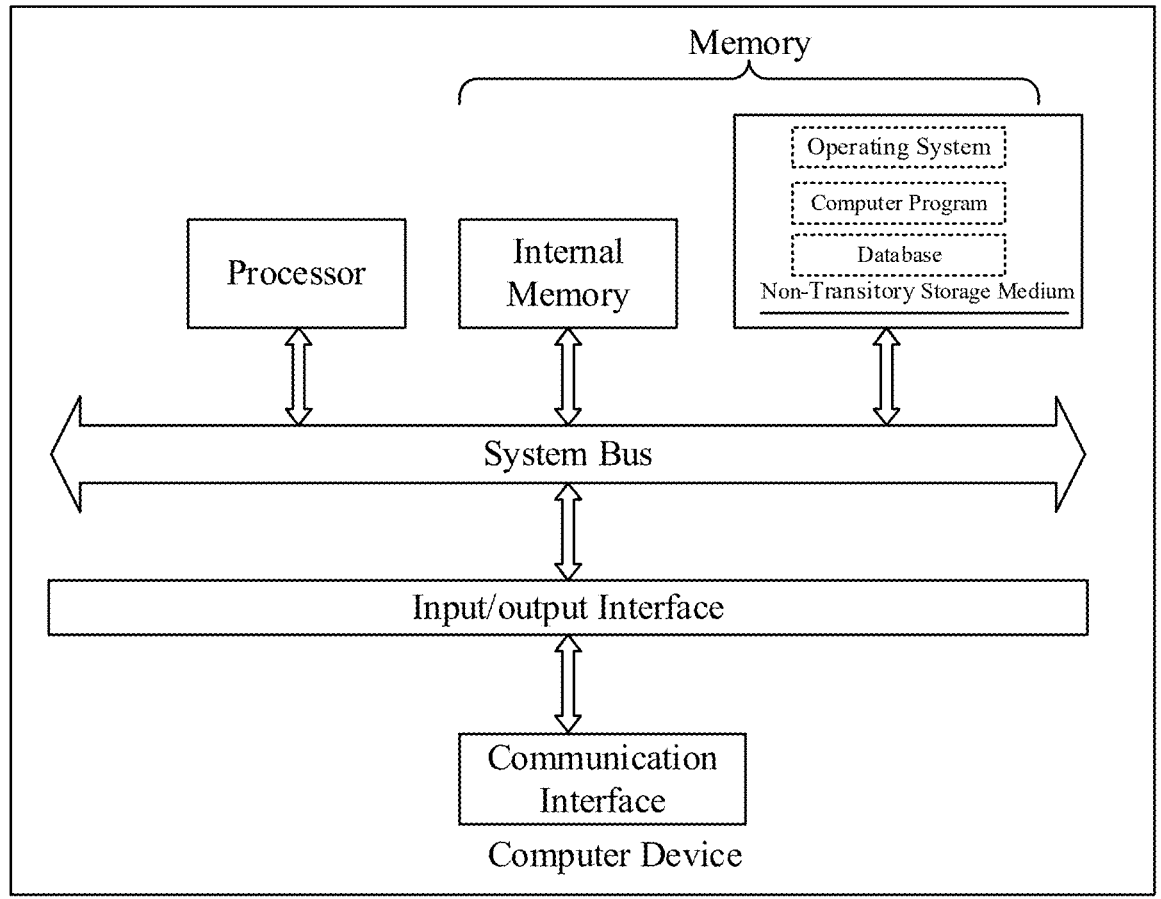
FIG. 15 is a diagram illustrating an internal configuration of a computer device according to embodiments of the present disclosure.

It should be understood by a person of ordinary skill in the art that the configuration illustrated in FIG. 15 is only a block diagram of part of the configuration related to the solution of the present disclosure, and does not constitute a limitation on the computer device to which the solution of the present disclosure is applied. A specific computer device may include more or less components than those shown in the figure, or may combine some components, or may have a different arrangement of components.

In an exemplary embodiment, a computer device is provided. The computer device includes a processor and a memory storing a computer program. The processor, when executing the computer program, implements the image display luminance compensation method as described above.

In an embodiment, a non-transitory computer-readable storage medium having a computer program stored therein is provided. When the computer program is executed by a processor, the image display luminance compensation method as described above is implemented.

In an embodiment, a computer program product is provided, including a computer program. When the computer program is executed by a processor, the image display luminance compensation method as described above is implemented.

A person of ordinary skill in the art may understand that implementation of all or part of the processes in the methods of the above embodiments may be completed by instructing the relevant hardware through a computer program. The computer program may be stored in a non-transitory computer-readable storage medium. When the computer program is executed, it may include the processes of the embodiments of the above methods. Any reference to memory, database or other medium used of the embodiments provided in the present disclosure may include at least one of a non-transitory or a transitory memory. The non-transitory memory may include a read-only memory (ROM), a magnetic tape, a floppy disk, a flash memory, an optical memory, a high-density embedded non-transitory memory, a resistive random-access memory (ReRAM), a magneto resistive random-access memory (MRAM), a ferroelectric random-access memory (FRAM), a phase change memory (PCM), or a graphene memory, etc. The transitory memory may include a random-access memory (RAM) or an external cache memory, etc. As an illustration rather than a limitation, the random-access memory may be in various forms, such as a static random-access memory (SRAM) or a dynamic random-access memory (DRAM), etc. The databases involved of the embodiments provided by the present disclosure may include at least one of a relational database and a non-relational database. The non-relational database may include, but is not limited to, a blockchain-based distributed database, etc. The processor involved of the embodiments provided by the present disclosure may be, but is not limited to, a general purpose processor, a central processor, a graphics processor, a digital signal processor, a programmable logic device, a data processing logic device based on quantum computation, an artificial intelligence (AI) processor, and the like.

The technical features in the above embodiments may be combined arbitrarily. For concise description, not all possible combinations of the technical features in the above embodiments are described. However, provided that they do not conflict with each other, all combinations of the technical features are to be considered to be within the scope described in this specification.

The above-mentioned embodiments only describe several implementations of the present disclosure, and their description is specific and detailed, but should not be understood as a limitation on the patent scope of the present disclosure. It should be noted that, for a person of ordinary skill in the art may further make variations and improvements without departing from the conception of the present disclosure, and these all fall within the protection scope of the present disclosure. Therefore, the protection scope of the present disclosure should be subject to the appended claims.

What is claimed is:

1. An image display luminance compensation method, comprising:

obtaining camera exposure times of respective grayscale images to be captured under a maximum target luminance;

controlling a photographing device to capture the grayscale images according to the camera exposure times, and obtaining luminance data of each of the grayscale images captured;

determining a target region in each of the grayscale images according to the luminance data of each of the grayscale images, the target region being a region to be subjected to luminance compensation;

calculating grayscale compensation values of the target region according to the luminance data of each of the grayscale images; and performing luminance compensation on the target region according to the grayscale compensation values of the target region;

wherein after obtaining the luminance data of each of the grayscale images captured, the method further comprises:

generating grayscale luminance curves of the grayscale images according to the luminance data of the grayscale images;

verifying validity of the luminance data of the grayscale images according to the grayscale luminance curves of the grayscale images to determine a verification result;

performing the step of determining the target region in each of the grayscale images according to the luminance data of each of the grayscale images when the verification result is valid; and re-capturing the grayscale images when the verification result is invalid.

2. The method according to claim 1, wherein verifying the validity of the luminance data of the grayscale images according to the grayscale luminance curves of the grayscale images to determine the verification result comprises:

determining that the verification result of the validity of the luminance data is valid when the grayscale luminance curves of the grayscale images do not intersect with each other; and determining that the verification result of the validity of the luminance data is invalid when the grayscale luminance curves of any two grayscale images intersect with each other.

3. The method according to claim 1, wherein determining the target region in each of the grayscale images according to the luminance data of each of the grayscale images comprises:

dividing each of the grayscale images into a plurality of region blocks, and dividing each of the region blocks into a plurality of processing regions;

determining a boundary strength of each of the region blocks according to differences between luminance data respectively corresponding to the plurality of processing regions and a standard target luminance; and determining the target region in each of the grayscale images according to the boundary strength of each of the region blocks.

4. The method according to claim 3, wherein the standard target luminance is an average luminance of pixels in a central region of a region block corresponding to each processing region.

5. The method according to claim 3, wherein each processing region comprises a plurality of pixel sub-regions, and after dividing each of the grayscale images into the plurality of region blocks, and dividing each of the region blocks into the plurality of processing regions, the method further comprises:

determining an average value of the luminance data of the plurality of pixel sub-regions in each processing region; and subtracting the average value of each processing region from a corresponding standard target luminance to obtain a difference between the luminance data corresponding to each processing region and the standard target brightness.

6. The method according to claim 3, wherein determining the boundary strength of each of the region blocks according to the differences between the luminance data respectively corresponding to the plurality of processing regions and the standard target luminance comprises:

comparing the differences between the luminance data respectively corresponding to the plurality of processing regions and the standard target luminance with a target standard luminance error threshold respectively to obtain the boundary strength of each of the region blocks.

7. The method according to claim 6, wherein comparing the differences between the luminance data respectively corresponding to the plurality of processing regions and the standard target luminance with a target standard luminance error threshold respectively to obtain the boundary strength of each of the region blocks comprises:

increasing, when the difference between the luminance data corresponding to the processing region and the standard target luminance is greater than the target standard luminance error threshold, an initial boundary strength of the region block corresponding to the processing region by a first preset value until all processing regions in the region block are traversed to obtain the boundary strength of each of the region blocks.

8. The method according to claim 3, wherein determining the target region in each of the grayscale images according to the boundary strength of each of the region blocks comprises:

taking the region block as the target region when the boundary strength of the region block is greater than a preset boundary strength.

9. The method according to claim 1, wherein performing the luminance compensation on the target region according to the grayscale compensation values of the target region comprises:

performing a spatial domain processing on the grayscale compensation values of the target region to obtain a spatial domain template of the target region;

performing a time domain processing on the spatial domain template to obtain a reordered template;

performing, according to the reordered template, a rounding and/or carry processing on the grayscale compensation values of the target region to obtain adjusted grayscale compensation values; and performing the luminance compensation on the target region according to the adjusted grayscale compensation values.

10. The method according to claim 9, wherein performing the spatial domain processing on the grayscale compensation values of the target region to obtain the spatial domain template of the target region comprises:

determining grayscale compensation values respectively corresponding to a plurality of pixel sub-regions of the target region from the grayscale compensation values of the target region;

performing a summation processing on decimal parts of the grayscale compensation values respectively corresponding to the plurality of pixel sub-regions to obtain an initial weight;

determining a spatial domain weight of the target region according to a weight value range of the initial weight; and generating the spatial domain template according to the spatial domain weight of the target region.

11. The method according to claim 9, wherein performing the time domain processing on the spatial domain template to obtain the reordered template comprises:

obtaining a preset frame refresh mode; and adjusting a carry position of a spatial domain weight in the spatial domain template according to the preset frame refresh mode to obtain the reordered template.

12. The method according to claim 1, wherein the luminance data of each of the grayscale images comprises luminance data of a plurality of pixels, and calculating the grayscale compensation values of the target region according to the luminance data of each of the grayscale images comprises:

solving a preset grayscale-luminance relationship curve function according to the luminance data of the plurality of pixels in each of the grayscale images to determine relationship parameters in the grayscale-luminance relationship curve;

generating a grayscale difference function according to the relationship parameters in the grayscale-luminance relationship curve;

inputting the luminance data of the plurality of pixels in each of the grayscale images and standard luminance data corresponding to each of the grayscale images into the grayscale difference function to obtain the grayscale compensation values of the pixels in the target region.

13. The method according to claim 12, wherein the standard luminance data is an average value of luminance data of a central region of the corresponding grayscale image.

14. A computer device comprising a processor and a memory storing a computer program, wherein the processor, when executing the computer program, implements:

obtaining camera exposure times of respective grayscale images to be captured under a maximum target luminance;

controlling a photographing device to capture the grayscale images according to the camera exposure times, and obtaining luminance data of each of the grayscale images captured;

determining a target region in each of the grayscale images according to the luminance data of each of the grayscale images, the target region being a region to be subjected to luminance compensation;

calculating grayscale compensation values of the target region according to the luminance data of each of the grayscale images; and performing luminance compensation on the target region according to the grayscale compensation values of the target region;

wherein after obtaining the luminance data of each of the grayscale images captured, the method further comprises:

generating grayscale luminance curves of the grayscale images according to the luminance data of the grayscale images;

verifying validity of the luminance data of the grayscale images according to the grayscale luminance curves of the grayscale images to determine a verification result;

performing the step of determining the target region in each of the grayscale images according to the luminance data of each of the grayscale images when the verification result is valid; and re-capturing the grayscale images when the verification result is invalid.

15. The computer device according to claim 14, wherein the processor further implements:

determining that the verification result of the validity of the luminance data is valid when the grayscale luminance curves of the grayscale images do not intersect with each other; and determining that the verification result of the validity of the luminance data is invalid when the grayscale luminance curves of any two grayscale images intersect with each other.

16. The computer device according to claim 14, wherein the processor further implements:

dividing each of the grayscale images into a plurality of region blocks, and dividing each of the region blocks into a plurality of processing regions;

determining a boundary strength of each of the region blocks according to differences between luminance data respectively corresponding to the plurality of processing regions and a standard target luminance; and determining the target region in each of the grayscale images according to the boundary strength of each of the region blocks.

17. The computer device according to claim 14, wherein the processor further implements:

performing a spatial domain processing on the grayscale compensation values of the target region to obtain a spatial domain template of the target region;

performing a time domain processing on the spatial domain template to obtain a reordered template;

performing, according to the reordered template, a rounding and/or carry processing on the grayscale compensation values of the target region to obtain adjusted grayscale compensation values; and performing the luminance compensation on the target region according to the adjusted grayscale compensation values.

18. A non-transitory computer-readable storage medium having a computer program stored therein, wherein the computer program, when executed by a processor, causes the processor to perform:

obtaining camera exposure times of respective grayscale images to be captured under a maximum target luminance;

controlling a photographing device to capture the grayscale images according to the camera exposure times, and obtaining luminance data of each of the grayscale images captured;

determining a target region in each of the grayscale images according to the luminance data of each of the grayscale images, the target region being a region to be subjected to luminance compensation;

calculating grayscale compensation values of the target region according to the luminance data of each of the grayscale images; and performing luminance compensation on the target region according to the grayscale compensation values of the target region;

wherein after obtaining the luminance data of each of the grayscale images captured, the method further comprises:

generating grayscale luminance curves of the grayscale images according to the luminance data of the grayscale images;

verifying validity of the luminance data of the grayscale images according to the grayscale luminance curves of the grayscale images to determine a verification result;

performing the step of determining the target region in each of the grayscale images according to the luminance data of each of the grayscale images when the verification result is valid; and re-capturing the grayscale images when the verification result is invalid.

* * * * *